US009988564B2

(12) United States Patent
Cantea

(10) Patent No.: US 9,988,564 B2
(45) Date of Patent: Jun. 5, 2018

(54) POLYURETHANE-BASED ADHESIVES

(71) Applicant: 3M INNOVATIVE PROPERTIES COMPANY, Saint Paul, MN (US)

(72) Inventor: Gabi Cantea, Düsseldorf (DE)

(73) Assignee: 3M Innovative Properties Company, St. Paul, MN (US)

(*) Notice: Subject to any disclaimer, the term of this patent is extended or adjusted under 35 U.S.C. 154(b) by 237 days.

(21) Appl. No.: 14/648,825

(22) PCT Filed: Dec. 4, 2013

(86) PCT No.: PCT/US2013/073116
§ 371 (c)(1),
(2) Date: Jun. 1, 2015

(87) PCT Pub. No.: WO2014/089210
PCT Pub. Date: Jun. 12, 2014

(65) Prior Publication Data
US 2015/0344753 A1    Dec. 3, 2015

(30) Foreign Application Priority Data
Dec. 5, 2012  (EP) .................................... 12195730

(51) Int. Cl.
| | | |
|---|---|---|
| *C09J 175/08* | (2006.01) | |
| *C09J 175/06* | (2006.01) | |
| *C09J 175/04* | (2006.01) | |
| *C09J 5/00* | (2006.01) | |
| *F03D 1/06* | (2006.01) | |
| *C08G 18/66* | (2006.01) | |
| *C08G 18/40* | (2006.01) | |
| *C08G 18/22* | (2006.01) | |
| *C08G 18/36* | (2006.01) | |
| *C08G 18/76* | (2006.01) | |

(52) U.S. Cl.
CPC .......... *C09J 175/08* (2013.01); *C08G 18/227* (2013.01); *C08G 18/36* (2013.01); *C08G 18/4018* (2013.01); *C08G 18/6625* (2013.01); *C08G 18/7664* (2013.01); *C09J 5/00* (2013.01); *C09J 175/04* (2013.01); *C09J 175/06* (2013.01); *F03D 1/0675* (2013.01); *C09J 2475/003* (2013.01); *Y02E 10/721* (2013.01)

(58) Field of Classification Search
CPC ...... C09J 175/08; C09J 175/06; C09J 175/04; C09J 5/00; C09J 2475/003; F03D 1/0675; Y02E 10/721; C08G 18/4018; C08G 18/6625; C08G 18/227; C08G 18/36; C08G 18/7664
See application file for complete search history.

(56) References Cited

U.S. PATENT DOCUMENTS

| | | |
|---|---|---|
| 5,587,448 A | 12/1996 | Eugen |
| 7,834,123 B2 | 11/2010 | Suen |
| 7,931,970 B2 | 4/2011 | Schlingloff |
| 2004/0162385 A1 | 8/2004 | Krebs |
| 2007/0270567 A1* | 11/2007 | Suen .................... C08G 18/165 528/64 |
| 2013/0288060 A1 | 10/2013 | Pind |
| 2013/0294921 A1 | 11/2013 | Pind |

FOREIGN PATENT DOCUMENTS

| | | |
|---|---|---|
| CN | 1171123 | 1/1998 |
| EP | 1857480 | 11/2007 |
| EP | 2222745 | 9/2010 |
| EP | 2468789 | 6/2012 |
| EP | 2469075 | 6/2012 |
| WO | WO 2003-006521 | 1/2003 |
| WO | WO 2007-009957 | 1/2007 |
| WO | WO 2009-080740 | 7/2009 |
| WO | WO 2011-035541 | 3/2011 |
| WO | WO 2011-080099 | 7/2011 |
| WO | WO 2011-081662 | 7/2011 |

OTHER PUBLICATIONS

International Search report for PCT International Application No. PCT/US2013/073116 dated Mar. 25, 2014, 3 pages.

* cited by examiner

*Primary Examiner* — Rabon Sergent
(74) *Attorney, Agent, or Firm* — Eric D. Levinson

(57) ABSTRACT

The present disclosure generally relates to curable precursor compositions for a polyurethane adhesive. In one exemplary embodiment, the composition includes (a) an isocyanate component comprising one or more isocyanates and (b) an isocyanate-reactive component comprising
(bi) one or more triols selected from polyether triols, polyester triols, polyether-polyester triols and combinations thereof;
(bii) one or more tetrols, selected from polyether polyols, polyester polyols, polyether-polyester polyols;
and wherein the composition further comprises a catalyst system capable of catalyzing the formation of polyurethanes wherein the curing catalyst system contains a combination of bismuth, zinc and zirconium salts.
Also provided are polyurethane-based adhesives, methods of bonding components with the adhesives and articles containing components bonded by the adhesives.

15 Claims, No Drawings

//!\\ # POLYURETHANE-BASED ADHESIVES

CROSS REFERENCE TO RELATED APPLICATIONS

This application is a national stage filing under 35 U.S.C. 371 of International Application No. PCT/US2013/073116, filed Dec. 4, 2013, which claims priority to European Application No. 12195730.2, filed Dec. 5, 2012. The disclosures of both applications are incorporated by reference in their entirety herein.

FIELD

The present disclosure relates to polyurethane-based adhesives. The adhesives are suitable for bonding large components, including for example but not limited to, rotor blades of wind turbines. The present disclosure also relates to adhesively bonded components, methods of making adhesives and methods of bonding large components.

BACKGROUND

Light weight articles are increasingly prepared by assembling large prefabricated components. Examples include the construction of watercrafts and rotor blades for wind turbines, which are typically prepared by joining two large prefabricated halves. Such components are typically bonded together using adhesives.

The increased demand for cost-efficiency has lead to such components having increasingly large dimensions. This requires suitable adhesives not only to have the required mechanical properties but also desirably to have long open pot times. Long open pot times allow the adhesives to be applied to large surface without premature curing, i.e. they can be applied to large surfaces in a single process step. In European Patent Application No. EP 2 222 745 a polyurethane-based adhesive composition is described, which has a long open pot time and is reported to be suitable for bonding large areas, like rotor blades of wind turbines.

However, an additional requirement for a cost-effective production process involves the rapid turn-over of the bonded components. This can be achieved by adhesives that rapidly generate a sufficient adhesive strength. This allows the bonded articles to be moved to the next position in the production line shortly after the application of the adhesives and thus makes the production process more cost-efficient.

SUMMARY

In the following there is provided a curable precursor composition for a polyurethane adhesive, said composition comprising
(a) an isocyanate component comprising one or more isocyanates and
(b) an isocyanate-reactive component comprising
   (bi) one or more triols selected from polyether triols, polyester triols, polyether-polyester triols and combinations thereof;
   (bii) one or more tetrols, selected from polyether tetrols, polyester tetrols, polyether-polyester tetrols;
and wherein the composition further comprises a catalyst system capable of catalyzing the formation of polyurethanes wherein the curing catalyst system contains a combination of bismuth, zinc and zirconium salts.

In a further aspect there is provided a polyurethane-based adhesive comprising the reaction product of the curable composition.

In yet another aspect there is provided a method of bonding components comprising
(i) applying the curable adhesive composition to at least one part of the components to be joined;
(ii) joining the components; and
(iii) curing the adhesive to provide a bond between the joined components.

DETAILED DESCRIPTION

Before any embodiments of this disclosure are explained in detail, it is understood that the disclosure is not limited in its application to the details of construction and the arrangement of components set forth in the following description. Contrary to the use of "consisting", the use of "including," "containing", "comprising," or "having" and variations thereof is meant to encompass the items listed thereafter and equivalents thereof as well as additional items. The use of "a" or "an" is meant to encompass "one or more". Any numerical range recited herein is intended to include all values from the lower value to the upper value of that range. For example, a concentration range of from 1% to 50% is intended to be an abbreviation and to expressly disclose the values between the 1% and 50%, such as, for example, 2%, 40%, 10%, 30%, 1.5%, 3.9% and so forth.

The adhesives provided by the present disclosure can be used to bond components, in particular resin-based components or components having resin-based surfaces. The adhesives according to the present disclosure may be suitable to bond components having large dimensions, for example, having a length of greater than about 10 m, or greater than about 20 m or even greater than about 40 m, for examples components having a length of from about 20 m to about 120 m or from about 30 to about 80 m. Typical components include components for the construction of watercrafts or rotor blades for wind turbines.

The adhesive compositions according to the present disclosure have a long open pot time. This allows large surfaces to be coated by the adhesive composition in one process step. The open pot time describes the time of how long the adhesive composition after being prepared by combining its reactive components can be suitably applied to a substrate without significant loss of adhesive strength or significant increase in viscosity. The adhesives according to the present disclosure typically have an open pot time of at least 30 min, more preferably at least 40 min or at least 50 min at ambient conditions (23° C. +/−3° C., 50% relative humidity (RH) +/−10%).

In addition to a long open pot time, the adhesives according to the present invention also have a short fixture time. The "fixture time" refers to the time required to develop sufficient bond strength (green strength) for the bonded article to be moved without breaking the bond. Typically a green strength of about 5 MPa is sufficient for this purpose. The green strength is referred to the bond strength of the adhesive that has not completely cured. The bond strength can still increase with progressing of the curing reaction. The adhesive compositions according to the present develop green strength of at least 5 MPa (as determined by lap shear strength), preferably at least 6 MPa, within 300 minutes curing at ambient conditions (23° C. +/−3° C.; 50% RH +/−10%).

The (completely) cured adhesives according to the present disclosure have a bond strength of at least 8 MPa at a temperature interval from about −40° C. up to about +40° C. This is particularly advantageous for the production of rotor blades for wind turbines as this temperature interval is the most typical temperature interval to which the bonded components will be exposed to.

Typically, the adhesives of the present disclosure are polyurethane-based. They are prepared from a precursor composition. The precursor composition contains an isocyanate-reactive component and an isocyanate component. These components react with each other to form polyurethane-based adhesives (the cured compositions). The precursor composition typically is a two-component (2K) composition. This means the reactive components are preferably kept separate from each other and are only combined to a curable adhesive composition before being applied to the substrate. The adhesive compositions provided herein thus comprise the reaction product of the (curing) reaction of the isocyanate-reactive component with the isocyanate component of the precursor composition. Suitable isocyanate-reactive components and suitable isocyanate-functional components will be described in greater detail below. The precursor compositions (and the resulting adhesives) further comprise a curing catalyst system. The curing catalyst system contains a combination of bismuth, zinc and zirconium salts.

A further advantage of the adhesive compositions according to the present disclosure is that the above described performance can be obtained with isocyanate-reactive components that are not aromatic.

Therefore, preferred embodiments of the adhesives of the present disclosure are essentially free of aromatic isocyanate-reactive components. "Essentially free means" a content of less than 2% by weight based on the total composition. In some embodiments, there is less than 1% by weight and in some embodiments, there is less than 0.1% by weight.

The following components of the adhesive and its precursor composition are provided herein as guidance to prepare precursor compositions that will cure to adhesive compositions having the desired properties described above.

Isocyanate Components

The isocyanate component contains an isocyanate-functional material or mixtures thereof. In some embodiments, the isocyanate comprises a polyisocyanate. Polyisocyanates have at least two isocyanate-functional groups, typically at the terminal position of the molecule. They provide urethane linkages when reacted with the hydroxyl groups of an isocyanate-reactive materials including for example but not limited to polyetherpolyols.

The polyisocyanates may be linear or branched, aliphatic, cycloaliphatic, heterocyclic or aromatic or a combination thereof. In one embodiment the composition is essentially free of aromatic isocyanates. Polyisocyanates preferably have from 2 to 4 isocyanate groups per molecule.

The polyisocyanates may include "prepolymers". Such "prepolymers" are polymerisation products of isocyanates with themselves, e g dimers, trimers, oligomers of isocycantes, or reaction products of isocyanates with isocyanate-reactive components to give an isocyanate functionalised product. Polyisocyanate prepolymers may be obtained by the reaction of a polyisocyanate, e.g. a difunctional isocyanate or "diisocyanates" with isocyanate-reactive compounds. The isocyanate-reactive compounds for making prepolymers contain reactive hydrogens that react with the isocyanate group of the isocyanate compound to form a link between isocyanate and isocyanate-reactive compound. Such reactive hydrogens are provided by functional groups like hydroxyl groups, ester groups and amino groups. The isocyanate-reactive compounds to form polyisocyanate prepolymers are typically bifunctional, preferably linear bifunctional compounds and include, for example, diols, diamines, diesters, hydroxyl esters and amino esters. The carbohydrate chain linking the functional groups may be interrupted by one or more oxygen atoms. For example, suitable diols include diol ethers or diol polyethers and suitable esters may include oxyalkylene esters or polyoxyalkylene esters. Typically the isocyanate-reactive compounds for making polyisocyanate prepolymers have from 2 to 20, preferably 4 to 14, more preferably 6 to 12 carbon atoms, which may or may not be interrupted by one or more oxygen atoms. Alkane diols, alkane diol ethers and alkane diol polyethers are the preferred isocyanate-reactive compounds. The prepolymers preferably include one or more urethane linkages, i.e. the prepolymer can be obtained by the reaction of one or more polyisocyanates (typically diisocyanates) and a hydroxyl component (typically a diol). Preferably, the polyisocyanate prepolymer contains at least two urethane units.

The polyisocyanates are preferably aromatic diisocyanates. Suitable aromatic diisocyanates include, 4,4'-methylenediphenylene diisocyanate (MDI), 4,6-di-(trifluoromethyl)-1,3-benzene diisocyanate, 2,4-tolune diisocyanate (2,4-TDI), 2,6-toluene diisocyanate, o-, m-, and p-xylylene diisocyanate, 4,4'-diisocyanatodiphenylether, 3,3'-dichloro-4,4'-diisocyanatodiphenylmethane, 4,5'-diphenyl diisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate. Examples of suitable aromatic triisocyantes include 4,4',4"-triphenylmethane triisocyanate.

Suitable polyisocyanates typically have an isocyanate content of 15-35%. Typically, the polyisocyanates have a molecular weight of from about 600 to about 4,000 g/mole, preferably from about 800 to 2,000 g/mole. Suitable polyisocyanates have an equivalent weight of from about 200 to about 600. Typically, the polyisocyanates according to the present disclosure have a viscosity from about 1,500 up to about 10,000, preferably up to about 8,000 mPa·s at 25° C. (DIN EN ISO 3219/A.3).

Typically, the polyisocyanates are prepolymers obtainable by a reaction of one or more aromatic polyisocyanates, preferably diisocyanates, as described above with one or more, preferably linear, isocyanate-reactive compounds as described above.

For making prepolymers the ratio of isocyanate equivalents of the polyisocyanate to hydroxyl groups from the polyetherpolyols preferably should be greater than about 1:1 and can range from about 1.05:1 up to about 1.5:1.

In a preferred embodiment, the polyisocyanate is a prepolymer using 4,4'-diphenylmethane diisocyanate (MDI) as isocyanate component including both polymeric MDI (including biuret and uretdione) and MDI-based prepolymers. Such polyisocyanates are commercially available, for example, from Bayer Material Science LLC under the trade designation DESMODUR and from Dow Europe under the trade designation VORANATE.

Isocyanate-Reactive Components

The isocyanate-reactive component is reacted with the isocyanate component to form the polyurethane-based adhesive of the present disclosure.

The isocyanate-reactive component typically contains a combination of several isocyanate-reactive materials. As understood by one of ordinary skill in the art an isocyanate-reactive material includes at least one active hydrogen. Those of ordinary skill in the polyurethane chemistry art will understand that a wide variety of materials are suitable for this component. For example, amines, thiols, and alcohols are isocyanate-reactive materials. In some embodiments, the isocyanate-reactive material is a hydroxyl-functional material. Polyols are one class of exemplary preferred hydroxyl-functional materials used in the present disclosure. Polyols provide urethane linkages when reacted with an isocyanate component, such as a polyisocyanate.

Suitable isocyanate-reactive materials to prepare the adhesives according to the present disclosure comprise a combination of different polyols. The isocyanate-reactive material comprises:
- (bi) one or more triols selected from polyether triols, polyester triols, polyether-polyester triols and combinations thereof;
- (bii) one or more tetrols, selected from polyether polyols, polyester polyols, polyether-polyester polyols; and
- (biii) one or more polyols with 5 to 12 hydroxyl groups.

Suitable triols according to (bi) typically include polyether triols, polyester triols, polyether-polyester triols and combinations thereof. In a particular embodiment component (bi) contains a combination of polyether triols and polyester triols.

The polyether triols typically have a molecular weight of from about 400 g/mole to about 4,000 g/mole, or from about 900 g/mole to about 2,500 g/mole. The molecular weight may be an average molecular weight, for example a number average weight as can be determined for example by size exclusion chromatography. Preferably, the polyether triols contain at least one or at least two primary hydroxyl groups. 'Primary hydroxyl groups' means terminal hydroxyl groups. The polyether triols may contain one or more alkane ether (alkylene oxy) groups. The alkane ether groups typically contain from 2 to 12 carbon atoms. Preferably the triols comprise one or more ethylene oxide units, propylene oxide units or combinations thereof. The polyethertriols, are preferably aliphatic. Generally, they are also saturated. The polyether triols may be branched, cyclic or linear.

The polyester triols typically include triglycerides of hydroxyl groups bearing carboxylic acids which may be of biological origin, for example castor oil. For example, the polyester triols may be fatty acid based, which means they contain residues derived from fatty acids. Examples include reaction products of epoxidized fatty acids with alcohols, or glycerol esters of long-chain fatty acids containing hydroxyl groups; ring-opening and transesterification products of epoxidized fatty acid esters of lower alcohols, i.e. of epoxidized fatty acid methyl, ethyl, propyl or butyl esters. Other examples include polyester triols obtainable by the transesterification of polyfunctional alcohols such as for example the addition product of ethylene oxide or propylene oxide onto glycerol with triglycerides, such as for example palm oil, peanut oil, rapeseed oil, cottonseed oil, soy oil, sunflower oil and linseed oil.

These polyester triols may contain a combination of different polyester alcohols and also blends having an average hydroxyl group number of from about 2.5 to 3.4 may be used. The polyester triols typically have a molecular weight from about 700 to about 2,000 g/mole, which may be a number average molecular weight.

Suitable tetrols according to component (bii) include tetrols selected from polyether tetrols, polyester tetrols polyether-polyester tetrols. Tetrols are polyols containing four hydroxyl groups per molecules. The tetrols are typically polyether tetrols and contain one or more alkane ether (alkylene oxy) groups. The alkane ether groups typically contain from 2 to 12 carbon atoms. Preferably the polyether tetrols comprise one or more ethylene oxide units, propylene oxide units or combinations thereof. The tetrols are preferably aliphatic and saturated. They may be branched, cyclic or linear. Typically, the tetrols are of comparatively low molecular weight. They may be in general of lower molecular weight than the polyether triols of component (bi). For example, the tetrols may have a molecular weight of from about 300 to 900 g/mole.

Suitable polyols for components (biii) are polyols having from about 5 to about 12 hydroxyl groups per molecules, for example but not limited to pentols, i.e. polyols having five hydroxyl groups per molecule. The polyols include polyols selected from polyether polyols, polyester polyols, polyether-polyester polyols with the proviso of having from about 5 to about 12 hydroxyl groups per molecule. The polyols are aliphatic. They may be linear, cyclic or branched. They typically are polyetherpolyols and contain one or more alkane ether (alkylene oxy) groups. The alkane ether groups typically contain from 2 to 12 carbon atoms. Preferably the polyether polyols comprise one or more ethylene oxide units, propylene oxide units or combinations thereof. The polyols, including the polyetherpolyols, are preferably aliphatic and may be branched, cyclic or linear. Generally they contain one or more than one secondary hydroxyl groups. Typical examples of suitable polyols according to component (biii) include sugar based polyols, for example sugars or modified sugars, for example ethoxylated sugars. Examples for sugar based polyols include polyols based on sorbitol, inositol, mannitol, threitol, erythreitol, adonitol, arabitol, ribitol, xylitol, dulcitol, ribose, xylose, glucose, galactose, mannose, allose, altrose, gulose, idose, talose, fructose, sorbose, psicose, glucosamine, galactosamine, sucrose, lactose, trehalose, maltose, cellobiose, melibiose, gentiobiose, rutinose. Typically the sugar based polyols are ethoxylation products containing up to 15 alkylene oxide units.

A further group of suitable polyether polyols for component (biii) includes polytetramethylene glycols which may for example be produced by acidic polymerization of tetrahydrofuran. The molecular weight of the polyols according to (biii) may typically be from about 400 to about 3,000 g/mole.

Typically, the triols according to component (bi) are present in great excess by weight over the polyols according to components (bii) and (biii).The polyols according to component (bi), (bii) and (biii) are preferably liquid at room temperature (they typically have a melting point or glass transition temperature below 23° C.).

In some embodiments, the compositions are essentially free of any aromatic diols and/or any polyesterdiols.

The polyols described above can be prepared by methods known in the art. Polyols as described above are also commercially available and include those available under the trade designation DESMOPHEN from Bayer AG, for example DESMOPHEN 1145 and DESMOPHEN 1150, and under the trade designation SOVERMOL from Cognis GmbH, or under the trade designation POLY-G from Arch Chemicals Inc. and under the trade designation VORANOL and TERCAROL from Dow Chemicals.

It is understood that instead of single polyols also blends of the respective polyols may be used.

It is also understood that in addition to the hydroxyl-functionalized material described in greater detail above other isocyanate-reactive components may be present, for example amine-functionalized materials which would form ureaurethane units. The term polyurethane as used herein is meant to include the presence of other units including polymeric units other than urethane-units. However, the reactive composition should predominantly contain the polyether polyols described in detail above (e.g. at least 50% or at least 60% or at least 75% or at least 90% or at least 95% by weight of the isocyanate-reactive material in the reactive composition should be made up of the polyether polyols described in greater detail above).

Catalysts

The compositions provided herein further comprise a curing catalyst system that is capable of catalyzing the reaction of isocyanates and isocyanate-reactive components to form polyurethanes. The catalyst system contains a combination of bismuth, zinc and zirconium salts, preferably salts of organic acids including for example carboxylates. Suitable catalysts are available commercially, either individually or as a combination, for example from Shephard Chemical Co, Ohio, USA, under the trade designation BICAT. The catalyst system may be present in the isocyanate component, the isocyanate-reactive components or in both. Typically, it is part of the polyisocyanate-reactive component. The catalyst system may be also be divided between the isocyanate component and the isocyanate-reactive component. For example, the zirconium salt may be added to the iscoyanate component and the bismuth and zinc salts may be added to the isocyanate-reactive component. It also possible to provide the catalyst system or parts of it or individual components thereof separately from the isocyanate and isocyanate-reactive components.

Additives

The precursor compositions according to the present disclosure and including their resulting adhesives may additionally contain auxiliary materials or additives. The additives are preferably admixed wholly or partially with the isocyanate-reactive component. The additives may be used in comparatively minor amounts to modify the properties of the adhesive, for example, to control the viscosity, wetting behavior, stability, bubble formation, storage life, colour or adhesion. Examples of additives include fillers, leveling agents, deaerating agents, thixotroping agents, stabilizers, colourants, desiccants and wetting agents.

Examples of stabilizers include antioxidants, UV stabilizers or hydrolysis stabilizers. Typical examples include sterically hindered amines (HALS). Examples of fillers include but are not limited to calcium carbonates, talcum, mica, titanium dioxide, iron oxides, aluminum oxides, zinc sulfates or silicon dioxides. Carbon black, iron oxides, titanium oxides, zinc oxides may be used as fillers or pigments. Zeolithes are examples of desiccants. Wetting agents may be used to improve the spreadability of the compositions on the substrate if necessary. Leveling agents and deaerating agents can be added to reduce the formation of bubbles or to reduce sagging of the compositions if necessary. Such additives are known and widely used in the art of making polyurethane-based adhesives.

Additives may comprise between from about 0 to 50% by weight based on the total weight of the composition. Additives may be present generally in an amount of from about 15 to 35% by weight.

An exemplary isocyanate-reactive component according to the present disclosure comprises from about 40 to about 75% by weight of triols according to component (bi);

from about 2 to about 10% by weight of tetrols according to component (bii);

from about 0.05 to 5% by weight of catalyst system; and from about 10 to about 40% by weight of additives wherein the weight percentages are based on the total weight of the isocyanate-reactive component and the amounts of the ingredient are chosen such that the sum of their weight percentages gives 100%.

The amount of the isocyanate component is typically chosen such that the isocyanate groups are present in a light molar excess over the isocyanate-reactive groups of the iscocyanate-reactive component (for example in a molar ratio of about 1.05:1.0 up to about 1.5:1.0). The catalyst system may be part of the isocyanate component instead of the isocyanate-reactive component or it may be part of both. It is also possible to use to divide the individual metal components of the catalyst system between isocyante and isocyanate-reactive component.

Another exemplary isocyanate-reactive component according to the present disclosure has a composition as described above but further comprises from about 2 to about 10% by weight of polyols according to (biii).

The adhesive compositions according to the present disclosure typically reach a bond strength (determined as lap shear strength) of 5 MPa, preferably 6 MPa within 240 minutes or at least after 300 minutes under ambient conditions (23° C. +/−3° C. and 50% RH +/−10%) after application of the freshly prepared composition. Typically, the cured compositions have an E modulus (DIN EN ISO 527) of at last 900 MPa.

The cured compositions typically have a lap shear strength of at least 6 MPa within the temperature range of from about −50° C. to about +60° C. or from −45° C. to about +55° C.

Methods of Making Adhesives

The curable adhesives according to the present disclosure may be prepared by mixing the reactive components of the precursor composition.

The isocyanate-reactive component may be prepared by mixing the polyols and then adding the additives. Solid additives are typically dispersed or dissolved in the composition making up the isocyanate-reactive component. Dispersion or dissolving may be achieved by heating. The moisture content of the ingredients and the isocyanate-reactive component should be kept low. The isocyanate component may only contain the isocyanate but may also contain inert additives. The two reactive components are kept separated from each other and are only combined prior to use to form a curable adhesive composition. The curable adhesives are typically extrudable. They can be applied by a 2K mixing gun (for example commercially available from Mixpack, Switzerland). The curable adhesives may also be applied as films or pastes onto the substrate, for example by roller coating or knife coating.

Substrates

Suitable substrates include, but are not limited to, fiber-resin composites. Such composite materials typically include inorganic or organic fibers or a combination thereof, including, for example but not limited thereto to glass fibers and carbon fibers as inorganic fibers and aramid fibers as organic fibers. The fibers may be woven or non-woven. The fibers are embedded in a resin or a combination of resins. Suitable resins include but are not limited to epoxy resins. Such fiber-reinforced composites are known in the art and are readily available from various suppliers.

The fiber-reinforced materials are typically shaped to form the desired parts of an article by molding. Such parts may be a component of a watercraft or a component of an aircraft. In a particular example, the part is a component of a rotor blade of a wind turbine. Rotor blades of a wind turbine or components of watercrafts are typically made of composite materials and manufactured in molds, typically as halves. After removal from the molds the halves are adhesively bonded. The surfaces to be bonded may be pretreated by sanding to obtain a smoother surface, although this may not be required. The surfaces are desirably dust-free. Pretreatment of the surface, like use of primers, may not be necessary. The components for water crafts or rotor blades for wind turbines may have a length of at least 40 m, at least 60 m, for example a length of from about 40 m to about 120 m, or from about 60 m to about 80 m or about 100 m.

The adhesives provided herein are particularly suitable for bonding the halves of rotor blades.

To bond substrates the curable adhesive composition is applied to at least one of the components. The components are then combined and the adhesive composition is subjected to curing to achieve a bond. Curing of the compositions provided herein can take place at ambient conditions. A green strength of at least 4 MPa (determined as LSS) may be achieved already after 4 hours, typically at least after 5 hours curing at ambient conditions (23° C. +/−3° C. and 50% relative humidity +/−10%). Complete curing may be achieved at ambient conditions already after 24 hours, preferably after 48 hours but typically at least after one week. The curing reaction can be accelerated by applying heat. Completeness of the curing reaction can be determined by measuring the LSS of samples over time. Complete curing is achieved if the LSS no longer increases.

EXAMPLES

Abbreviations

POLY G®73-490: high functionality sorbitol based polyol, available from Arch Chemicals Inc., Norwalk, USA, with an average number of hydroxyl groups of about 5 and a molecular weight of 570 g/mole.

POLY G® 76-120: Polyether triol containing about 80% or primary OH groups and a molecular weight of about 1,400 g/mole, available from Arch Chemicals Inc., Norwalk, USA. 80% primary OH POLY G 540-555: Polyether tetrol having a molecular weight of about 400 g/mole, available from Arch Chemicals Inc., Norwalk, USA.

SOVERMOL 815: Branched polyether/polyester triol, available from BASF AG, Ludwigshafen, Germany.

CASTOR OIL: Triglyceride vegetable oil, available from Mekiro BV, Liverpool, UK.

BICAT 3184M: Zn/Bi/Zr blend catalyst available from The Shepherd Chemical Co, Ohio, USA.

VORANATE M229: polymeric MDI, isocyanate equivalent 135, available from Dow Europe SA, Meyrin, Switzerland.

DESMODUR VKS 20F: is a mixture of diphenylmethane-4,4'-diisocyanate (MDT) with isomers and higher functional homologues (MIDI), available from Bayer MaterialScience AG, Leverkusen, Germany.

Test Methods

1. Lap Shear Strength Test (LSS)

Lap Shear Strength Test (LSS) was determined in tensile mode on a Zwick tensile tester 100 kN, according to ISO 4587 test method. 5 mm thick epoxy glass fiber composite test panels (e Vetronit EGS 619 100×25×5 mm from Rocholl) were used.

Sample preparation: the adhesive compositions were applied at a thickness of 1 mm (bond line thickness) on the overlap area of the test panels. The overlap area of the panels was 25 mm×12.5 mm. The panels were subjected to curing as specified below. Lap shear strength measurements were carried out at the temperatures as indicated in the examples at a pulling rate of 1-2 mm/min. Reported values are average of measurements from 10 samples.

2. Fixture Time and Green Strength

The adhesive was applied to test panels as described above and allowed to cure for 4.7 hours at room temperature (25° C. +/−3° C.) and 50% (+/−10) RH after which the bond performance was evaluated by the lap shear strength test as described above. Reported values are averages of measurements from 10 samples.

3. Open Pot Time

Samples were applied to test panels for the LSS. The test panels were not combined and the samples were left on the panels at room temperature and relative humidity as indicated in the tables below for various periods after the adhesive had been prepared. In intervals of 5 minutes after preparing the adhesives up to 60 minutes thereafter test panels were combined and subjected to heat curing at 40° C. for 16 hours and tested for the lap shear strength. The samples showed a reduction in shear strength depending on the time passed after they had been prepared and before the bond was formed by combining the test panels. The period after the samples had been prepared until a drop of shear strength by 15% was observed is defined as open pot time.

4. Mechanical Properties

Samples of freshly prepared adhesive compositions were applied to test panels and subjected to curing at ambient conditions (23° C. +/−3° C., RH 50% +/−10%) for one week prior to testing. The fully cured samples were tested at 3 different temperatures: −40° C., 23° C. and 50° C. according to ISO 4587 on a Zwick tensile tester.

5. General Preparation of Precursor Compositions 5.a. Isocyanate Component

The isocyanate can be used as received from the supplier and according to the supplier's instructions. The isocyanate forms part A of the precursor composition.

5.b. Isocyanate-Reactive Component (Polyol Component)

The polyols are blended using a high shear mixer to form a homogeneous blend. Additives, if needed can be sequentially added. The mixture can be heated for example to 60 or 80° C. during the addition of the additives to achieve greater homogeneity and better drying of the system. Vacuum is typically applied after each addition to remove residual moisture. The water content should be measured (for example by Karl Fisher titration) and should not be greater than 500 ppm. In case the water content is higher, the mixture should be subjected to heating under vacuum to reduce the water content. This measure should be repeated after every addition of additives or raw materials.

At a final step the catalyst is added, preferably when the mixture is brought to a temperature of 60° C. The mixture may be stirred for 30 min after the addition of the catalyst. The water content should be measured and if necessary brought to less than 500 ppm. The resulting mixture forms part B of the precursor.

6. Preparation of Curable Adhesive Compositions From the Precursor Compositions

1 Part A and 2 parts B mixed at ambient conditions in an automatic 2K metering machine to give an adhesive composition.

Example 1

A curable adhesive composition was prepared according to general method described in 5. and 6. above using the ingredients and their amounts as shown in table 1. The curable adhesive composition was applied to the test panels as described in 1. above and tested for various properties. The green strength of the samples was 6.4 MPa (average from 3 samples) after curing the samples at ambient conditions ((23° C. +/−3° C., relative humidity of 50% +/−10) for 5 hours (fixture time). The Lap Shear Strength of completely cured samples was measured at 3 different temperatures as indicated in table 2. Lap shear strength values are also reported in table 2. The open time of the samples was greater than 50 minutes as shown in table 3. For all tests three samples were used and the reported test results are the averaged results.

TABLE 1 ingredients of example 1:

| Polyol component | Weight (g) | Functionality | Eq.-weight | Eq. 1 |
|---|---|---|---|---|
| Poly G73-490 | 8.5 | 5 | 114.3 | 0.0874 |
| Poly G76-120 | 19.54 | 3 | 466.6 | 0.0492 |
| Sovermol 815 | 19.54 | 3.3 | 260.5 | 0.0882 |
| Poly G540-555 | 5.8 | 4 | 100.9 | 0.0675 |
| Castor oil | 17 | 3 | 343.5 | 0.0582 |
| Additives (including 2.3 ppw of M-DEA) | 29.4 | | | |
| Bicat 3184M (catalyst) | 0.15 | | | |
| TOTAL | 100 | | | 0.3508 |

| NCO-Component | Weight (g) | Functionality | Eq.-weight | Eq. 2 |
|---|---|---|---|---|
| Voranate M229 | 49.75 | 2.7 | 135.04 | 0.3684 |
| NCO/OH (eq. 2/eq. 1) | | | | 1.03 |
| Total weight (g) | | | | 149.75 |

TABLE 2

Lap Shear Strength (LSS) measurement and E modulus of completely cured samples

| Lap Shear Strength | Test temperature | | |
|---|---|---|---|
| (LSS) [MPa] | −40° C. | +23° C. | +50° C. |
| | 18.5 | 20.5 | 9.65 |
| E modulus [MPa] | | 1008 | |
| Green strength (Lap Shear Strength [MPa] after 5 hours curing at 23° C. | | 6.4 | |

TABLE 3

Lap Shear Strength after different open times

| | | Time after adhesives were prepared in min | | | |
|---|---|---|---|---|---|
| | | 10 | 30 | 50 | 55 |
| Temperature | Humidity | LSS in MPa | | | |
| 23° C. | 55% RH | 20.6 | 19.73 | 17.83 | 17.86 |
| | 65% RH | 20.26 | 19.4 | 15.86 | 15.93 |

Examples 2-4

Adhesive compositions were prepared according to example 1 with the exception that different catalysts were used. In example 2 a zirconium salt (BICAT 4130M) was used. In example 3 a zinc catalyst (BICAT ZM) and in example 4 a bismuth catalyst (BICAT 8108M) were used.

Example 2 gave an open pot time of more than 75 minutes but the green strength was insufficient: after 5 hours a lap shear strength of less than 0.6 Mpa was measured.

Example 3 gave an opent pot time of about 12 minutes.

Example 4 had an open time of about 1 min together with a high exothermic reaction making the composition unusable.

Example 5

Example 1 was repeated but instead of using the polyether tetrol an aromatic diol was used. The E modulus was determined according to DIN EN ISO 527 to be 581 MPa (average from six measurements) compared to the E modulus obtained from example 1 which was 1008 MPa (average from six measurements). The E modulus is an indication of lap shear strength. The higher the E modulus the higher will be the lap shear strength of a sample. The result of example 5 shows that by replacing diols with tetrols a higher green strength of the adhesive compositions can be achieved in combination with the catalyst system according to the present disclosure.

Example 6

Example 1 was repeated but instead of using the polyether tetrol the amount of polyether triols was increased. The E modulus was determined according to DIN EN ISO 527 to be 399 MPa (average from six measurements) compared to the E modulus obtained from example 1 which was 1008 MPa (average from six measurements). Example 6 shows that by replacing tetrols with triols the green strength of the adhesive compositions will be reduced.

In the following there is provided a list of particular embodiments to further illustrate the present disclosure without intending to limit the disclosure to the specific embodiments listed below.

1. A curable precursor composition for a polyurethane adhesive, said composition comprising
   (a) an isocyanate component comprising one or more isocyanates and
   (b) an isocyanate-reactive component comprising
      (bi) one or more triols selected from polyether triols, polyester triols, polyether-polyester triols and combinations thereof;
      (bii) one or more tetrols, selected from polyether tetrols, polyester tetrols, polyether-polyester tetrols;
   and wherein the composition further comprises a catalyst system capable of catalyzing the formation of polyurethanes wherein the curing catalyst system contains a combination of bismuth, zinc and zirconium salts.
2. The curable composition according to embodiment 1 wherein the one or more triols include polyester triols and polyether triols.
3. The curable composition according to any one of the preceding embodiments wherein the polyether triols have at least one primary hydroxyl group.
4. The curable composition according to any one of the preceding embodiments wherein the polyether triols have at least one primary hydroxyl group and have a molecular weight of from about 300 to about 1,400 g/mole.
5. The curable composition according to any one of the preceding embodiments wherein the polyestertriols comprise triglycerides.

The invention claimed is:

1. A curable precursor composition for a polyurethane adhesive, said composition comprising
   (a) an isocyanate component comprising one or more isocyanates and
   (b) an isocyanate-reactive component comprising
      (bi) one or more triols selected from polyether triols, polyester triols, polyether-polyester triols and combinations thereof;
      (bii) one or more tetrols, selected from polyether tetrols, polyester tetrols, polyether-polyester tetrols;

wherein the composition further comprises a catalyst system capable of catalyzing the formation of polyurethanes wherein the catalyst system contains a combination of bismuth, zinc and zirconium salts; and
   wherein the composition is capable of curing at ambient conditions.

2. The curable composition according to claim 1 wherein the one or more triols include polyester triols and polyether triols.

3. The curable composition according to claim 1, wherein the polyether triols have at least one primary hydroxyl group.

4. The curable composition according to claim 1, wherein the polyether triols have at least one primary hydroxyl group and have a molecular weight of from about 300 to about 1,400 g/mole.

5. The curable composition according to claim 1, wherein the polyestertriols comprise triglycerides.

6. The curable precursor composition according to claim 1, wherein the precursor is essentially free of aromatic diols.

7. The curable composition according to claim 1, wherein the isocyanate-reactive component (b) further comprises: (biii) one or more polyols with 5 to 12 hydroxyl groups.

8. The curable composition according to claim 1, wherein the isocyanate-reactive component (b) further comprises: (biii) one or more polyols with 5 hydroxyl groups selected from pentols having a molecular weight of from about 300 to about 1,500 g/mole.

9. The curable precursor composition according to claim 1, wherein the precursor is essentially free of any aromatic polyols.

10. The curable precursor composition according to claim 1, having a molar NCO/OH ratio of from about 0.8:1 to about 1.5:1.

11. A polyurethane-based adhesive comprising the reaction product of the curable composition according to claim 1.

12. An article comprising at least a first component and a second component, and wherein an adhesive of claim 11 is between the first and second components and forms a bond between the first and second components.

13. The article of claim 12 wherein the first and second components have a length of at least about 40 m.

14. The article according to claim 12, wherein the article is a rotor blade for a wind energy turbine and the first and second components are first and second halves of the rotor blade.

15. A method of bonding components comprising
   (i) applying the precursor composition for a polyurethane adhesive according to claim 1 to at least a part of each of a first component and a second component;
   (ii) joining the first and second components; and
   (iii) curing the adhesive to form a bond between the first and second components at ambient conditions.

* * * * *